(12) United States Patent
Fujimoto et al.

(10) Patent No.: US 9,770,942 B2
(45) Date of Patent: Sep. 26, 2017

(54) SOUNDPROOF WHEEL FOR RAILWAY VEHICLE

(71) Applicant: NIPPON STEEL & SUMITOMO METAL CORPORATION, Tokyo (JP)

(72) Inventors: Takahiro Fujimoto, Kobe (JP); Hideki Minami, Kyoto (JP); Hiroki Sakai, Nishinomiya (JP); Shingo Abe, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/775,744

(22) PCT Filed: Mar. 24, 2014

(86) PCT No.: PCT/JP2014/001670
§ 371 (c)(1),
(2) Date: Sep. 14, 2015

(87) PCT Pub. No.: WO2014/156102
PCT Pub. Date: Oct. 2, 2014

(65) Prior Publication Data
US 2016/0023510 A1    Jan. 28, 2016

(30) Foreign Application Priority Data

Mar. 28, 2013 (JP) ................... 2013-070314

(51) Int. Cl.
*B60B 17/00* (2006.01)

(52) U.S. Cl.
CPC ...... *B60B 17/0024* (2013.01); *B60B 17/0068* (2013.01); *B60B 2900/133* (2013.01); *B60B 2900/321* (2013.01)

(58) Field of Classification Search
CPC ... B60B 17/00; B60B 17/0017; B60B 17/002; B60B 17/0024
(Continued)

(56) References Cited

U.S. PATENT DOCUMENTS 4,254,985 A * 3/1981 Kirschner ........... B60B 17/0027
295/6
4,364,594 A * 12/1982 Raquet ................ B60B 17/0017
105/452
(Continued)

FOREIGN PATENT DOCUMENTS

DE    3120068         12/1982
EP    0050567 A1 *    4/1982  ............ B60B 17/00
(Continued)

OTHER PUBLICATIONS

Machine translation of EP0050567, 10 pages.*

*Primary Examiner* — Jason Bellinger
(74) *Attorney, Agent, or Firm* — Clark & Brody

(57) ABSTRACT

A soundproof wheel includes a soundproofing device which is mounted to an inner peripheral surface of a rim section of the wheel. The soundproofing device is provided with: a fixing ring which is fitted in and fixed to a groove formed in the inner peripheral surface of the rim section; an elastic body section which is adhered to an outer peripheral surface of the fixing ring, is disposed within the groove, and has a plurality of elastic body pieces; and an additional mass section which is adhered to an opposite side of the elastic body section with respect to the fixing ring, is disposed within the groove, and has a plurality of additional mass pieces. The soundproofing device includes a plurality of dynamic vibration absorbers, each having an elastic body piece and an additional mass piece. This soundproof wheel allows for reduction in wheel vibration noise and is highly durable.

9 Claims, 7 Drawing Sheets

(58) Field of Classification Search
USPC .......................................................... 295/6–7
See application file for complete search history.

(56) References Cited

U.S. PATENT DOCUMENTS

| | | | |
|---|---|---|---|
| 4,392,681 A | | 7/1983 | Raquet |
| 4,496,183 A | * | 1/1985 | Kasper ................ B60B 17/0017 |
| | | | 105/452 |
| 4,970,909 A | * | 11/1990 | Pelzer ..................... F16H 55/14 |
| | | | 295/7 |
| 5,092,192 A | * | 3/1992 | Pelzer ..................... F16H 55/14 |
| | | | 295/7 |
| 5,415,063 A | * | 5/1995 | Honlinger ............... F16H 55/36 |
| | | | 181/207 |
| 7,625,030 B2 | * | 12/2009 | Bieker ................ B60B 17/0006 |
| | | | 188/33 |

FOREIGN PATENT DOCUMENTS

| | | |
|---|---|---|
| JP | 58-116202 | 7/1983 |
| JP | 2577323 | 5/1998 |
| JP | 3097831 | 10/2000 |
| JP | 2006-182136 | 7/2006 |

\* cited by examiner

SOUNDPROOF WHEEL FOR RAILWAY VEHICLE

TECHNICAL FIELD

The present invention relates to a soundproof wheel for a railway vehicle, and particularly to a soundproof wheel for a railway vehicle, which allows for significant reduction in noise caused by the vibration of the wheel, and is also excellent in durability.

BACKGROUND ART

The noise generated when a railway vehicle travels is a top-priority issue to be solved for railroad wayside environments. Such noise includes those generated from wheels. Noise generated from a wheel includes wheel rolling noise and so-called squeak noise. The squeak noise is mostly generated when a vehicle passes a curved road having a large curvature. The wheel rolling noise is generated not only when a vehicle passes a curved road but also when it passes a straight road.

The surface of a rail, as well as the surface of a wheel which comes into contact therewith have minute unevenness. As a result, when the wheel rolls on the rail, the wheel and the rail are excited, conceivably causing wheel rolling noise. It is also conceived that the squeak noise is attributable to the vibration of the wheel. Moreover, a peculiar wheel noise occurs in such a way that: when there is a portion that has wave-like wear (hereafter, referred to as "wavy wear") on a tread part, which is a portion to come into contact with the wheel, in the rail, and if the vehicle passes on such a worn portion, the wheel is severely excited, thus causing noise.

To reduce the noise generated by the vibration of a wheel (hereafter, referred to as "wheel vibration noise"), Patent Literatures 1 and 2 have proposed a soundproof wheel in which a soundproofing device is attached to an inner peripheral side of a rim section of the wheel. Such a soundproof wheel is equipped with a soundproofing device which is composed of a combination of an elastic body section such as rubber and an additional mass section and is attached to an attachment groove formed in an inner peripheral surface of the rim section with a metal attachment.

Such a soundproofing device is considered to act as a dynamic vibration absorber. A dynamic vibration absorber has a resonance frequency, which coincides with a natural frequency of a structure, and can absorb (reduce) the vibration of the structure through resonance. Therefore, by attaching such a soundproofing device to a wheel, it is possible to reduce the noise due to natural vibration of the coinciding frequency. The resonance frequency f of a soundproofing device is given by:

$$f=(1/2\pi)\times(k/m)^{1/2} \quad (1)$$

where $\pi$ is the circular constant, k is a spring constant of the elastic body section, and m is the mass of the additional mass section. Therefore, given a natural frequency of a wheel, it is possible to determine the spring constant k and the mass m of the additional mass section from Formula (1) such that the resonance frequency f of the soundproofing device coincides with the natural frequency.

A wheel normally has multiple natural vibration modes, and natural frequencies corresponding to those natural vibration modes. Therefore, a wheel also has multiple natural frequencies. Patent Literatures 2 and 3 have proposed a soundproof wheel including a plurality of soundproofing devices each having a different resonance frequency, in which the resonance frequency of each sound proofing device coincides with any of the multiple natural frequencies of the wheel. According to these soundproof wheels, it is possible to concurrently reduce noise corresponding to multiple natural frequencies.

Specifically, in the wheel of Patent Literature 2, two soundproofing devices are used in which two types of elastic bodies each having a different elastic constant are used respectively, such that the resonance frequencies of the two soundproofing devices are different from each other. In the wheel of Patent Literature 3, a soundproofing device (a dynamic vibration absorber consisting of an elastic body and an abutment plate) is divided in a circumferential direction of the soundproof wheel, and an adjustment is made such that each resonance frequency of the divided soundproofing devices coincides with any of natural frequencies of the wheel. Such a configuration makes it possible to concurrently absorb noise components corresponding to two or more levels of frequencies. Further, as a result of being divided in the circumferential direction of the soundproof wheel, the soundproofing device disclosed in Patent Literature 3 makes it possible to increase the natural frequencies of the abutment plate to higher frequencies which will not cause any problem as noise.

Among natural vibration modes of a wheel, a primary mode which may cause wheel rolling noise is one in which the rim section vibrates in an in-plane direction and the plate section vibrates in an out-of-plane direction. Such noise due to natural vibrations include at least, 3 levels of frequency components, for example, around 2 kHz, around 3 kHz, and around 4 kHz in a range of 1 kHz to 10 kHz of frequency ranges to which human auditory sense is sensitive.

Meanwhile, when a vehicle is traveling at a high speed, the soundproofing device is subject to various forces, causing a risk that the soundproofing device falls off from the wheel. In the inventions according to Patent Literatures 1 to 3, sufficient measures have not been taken to prevent the soundproofing device from falling off from the wheel.

Patent Literature 4 discloses a soundproofing device including a ring-shape additional mass section, and an elastic body section attached to an outer peripheral portion of the additional mass section, in which the elastic body section is disposed in a groove formed in a rim section.

The soundproof wheel of Patent Literature 4 is configured such that the elastic body section is fixed to a bottom portion of a groove formed in the rim section and to the additional mass section, while the additional mass section is movable with respect to the rim section. Such configuration allows absorption of vibration of the wheel.

In this soundproofing device, since the opening side of the groove is blocked by the additional mass section with respect to the elastic body section, the elastic body section is not likely to fall off from the wheel even if it is separated from the additional mass section. However, in this invention, when the elastic body section deteriorates, the displacement of the additional mass section with respect to the rim section during travelling of the vehicle increases, and the additional mass section may collide with other members, such as a brake disk. Moreover, as a result of that the inner surface of the groove of the rim section and the additional mass section are rubbed against each other, a flaw may occur in the rim section and the additional mass section, or these members may be worn. Further, when the elastic body section is separated completely, there is possibility that additional mass section falls off from the wheel. For this reason, a wheel equipped with the soundproofing device is less durable.

CITATION LIST

Patent Literature

Patent Literature 1: Japanese Utility Model No. 2577323
Patent Literature 2: Japanese Patent No. 3097831
Patent Literature 3: Japanese Patent Application Publication No. 58-116202
Patent Literature 4: Japanese Patent Application Publication No. 2006-182136

SUMMARY OF INVENTION

Technical Problem

Accordingly, it is an objective of the present invention to provide a soundproof wheel for a railway vehicle, which allows for significant reduction in noise caused by the vibration of the wheel, and is also excellent in durability.

Solution to Problem

The gist of the present invention is a soundproof wheel described in the following (A):

(A) A soundproof wheel for a railway vehicle, including a soundproofing device mounted onto an inner peripheral surface of a rim section of the wheel, the soundproofing device including:

a fixing ring fitted in a groove at least in an outer peripheral portion of the fixing ring, the groove being formed in the inner peripheral surface of the rim section and opened toward a central axis of the wheel, the fixing ring being fixed to the rim section;

an elastic body section which is adhered to an outer peripheral surface of the fixing ring along a circumferential direction of the fixing ring, and is disposed in the groove; and an additional mass section which is adhered to an opposite side of the elastic body section with respect to the fixing ring, and is disposed in the groove, wherein the elastic body section includes a plurality of elastic body pieces disposed along the circumferential direction of the fixing ring, the additional mass section includes a plurality of additional mass pieces which are spaced apart from each other in the circumferential direction of the fixing ring, each additional mass piece being adhered to any of the plurality of elastic body pieces, the wheel has multiple natural frequencies corresponding to multiple natural vibration modes, the soundproofing device includes a plurality of dynamic vibration absorbers, each dynamic vibration absorber having the elastic body piece, and the additional mass piece adhered to the elastic body piece, and at least one dynamic vibration absorber of the plurality of dynamic vibration absorbers has a resonance frequency different from the resonance frequencies of the other dynamic vibration absorbers, and any of the resonance frequencies of the plurality of dynamic vibration absorbers corresponds to any of the multiple natural frequencies.

Note that the width of the elastic body section in the axial direction of the soundproofing device is preferably not less than 5 mm and not more than 10 mm. In that case, the width of the additional mass section in the axial direction of the soundproofing device is preferably not less than 5 mm and not more than 10 mm In a cross section containing the axis of the soundproof wheel, the groove includes:

a first portion having a width equal to a minimum width of the fixing ring, or larger than the minimum width, and a second portion formed nearer a bottom of the groove with respect to the first portion, and having a width smaller than the minimum width of the fixing ring.

The soundproof wheel preferably includes a protrusion interposed between the dynamic vibration absorbers adjacent to each other in the circumferential direction, and protruding from the outer peripheral surface of the fixing ring.

When the soundproof wheel includes the protrusion, a distal end of the protrusion is preferably in contact with the bottom of the groove.

Advantageous Effects of Invention

According to the present invention, due to the configuration that the fixing ring is fixed to the rim section of the wheel, the vibration of the wheel is transmitted to the plurality of dynamic vibration absorbers (elastic body pieces and additional mass pieces) through the fixing ring. Since at least one dynamic vibration absorber of the plurality of dynamic vibration absorbers has a resonance frequency different from the resonance frequencies of the other dynamic vibration absorbers, the resonance frequency of each dynamic vibration absorber corresponds to any of the multiple natural frequencies of the wheel, it is possible to concurrently reduce noise corresponding to natural frequencies of not less than 2 levels, thereby significantly reducing wheel vibration noise.

Moreover, according to the present invention, the elastic body section and the additional mass section are disposed in the groove of the rim section, and a fixing ring fixed to the rim section lies at an opening side of the groove with respect to the elastic body section and the additional mass section. As a result, even if an additional mass section is separated from the elastic body section, or an elastic body section is separated from the fixing ring, it is not likely that those separated elastic body section and additional mass section fall off the soundproof wheel.

Further, due to the configuration that the fixing ring which is one of the components constituting the soundproofing device is fixed to the rim section of the wheel, there will be no rubbing between the soundproofing device and the rim section of the wheel. Furthermore, even if the elastic body section deteriorates, resulting in decline in elasticity thereof, the additional mass section will not collide with any member other than the rim section. Therefore, the soundproof wheel is highly durable.

DESCRIPTION OF EMBODIMENTS

Hereafter, embodiments of the present invention will be described in detail with reference to the appended drawings.

Figure 1A:
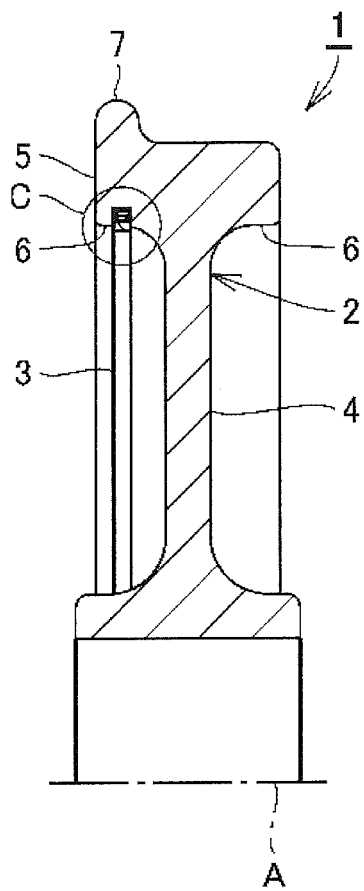
FIG. 1A is a sectional view of a soundproof wheel according to an embodiment of the present invention, showing one side portion of the soundproof wheel with respect to its central axis.
Figure 1B:
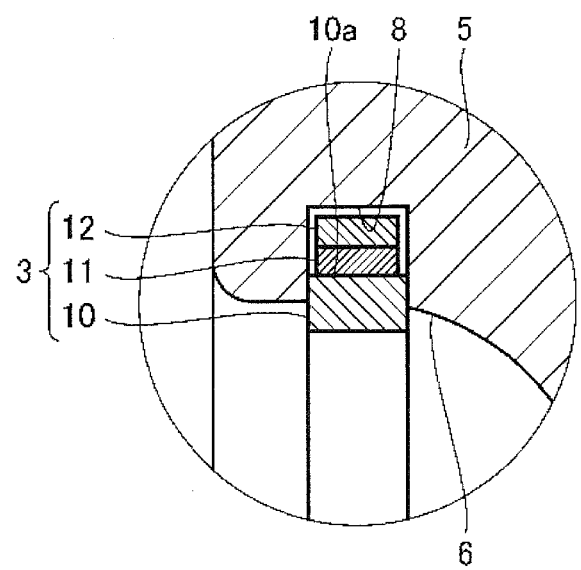
FIG. 1B is an enlarged view of a region shown by a circle C in FIG. 1A.

FIGS. 1A and 1B are sectional views of a soundproof wheel according to an embodiment of the present invention, in which FIG. 1A shows one side portion of the soundproof wheel with respect to its central axis, and FIG. 1B shows an enlarged view of a region shown by a circle C in FIG. 1A.

The soundproof wheel 1, which is used for railway vehicles, includes a wheel 2 and a soundproofing device 3. The wheel 2 includes an annular plate section 4, and an annular rim section 5 located in an outer peripheral portion of the plate section 4. The rim section 5 protrudes to both sides in the thickness direction of the plate section 4 with respect to the plate section 4, and has an inner peripheral surface 6 which faces a central axis A of the soundproof wheel 1. In an outer peripheral surface of the rim section 5, a flange 7 protrudes, at one side with respect to the direction along the central axis A, in the opposite direction to the central axis A.

In the rim section 5, a groove 8, which opens up in the central axis A direction, is formed in an annular shape around the central axis A in the inner peripheral surface 6 on one side (the same side of the flange 7) with respect to the direction along the central axis A. The soundproofing device 3 is fitted in the groove 8 over the entire circumference of the groove 8.

The soundproofing device 3 includes a fixing ring 10, an elastic body section 11 adhered to an outer peripheral surface 10a of the fixing ring 10, and an additional mass section 12 adhered to an opposite side of the elastic body section 11 with respect to the fixing ring 10. The fixing ring 10 is made of a high rigidity material such as a metal. The fixing ring 10 has an outer peripheral side portion in the radial direction to be fitted in the groove 8 and fixed to the rim section 5. The fixing of the fixing ring 10 to the rim section 5 can be performed by, for example, welding, caulking, bonding, etc.

A width (length in an axial direction of the soundproofing device 3) of the fixing ring 10 is about the same as a width of the groove 8, and the opening part of the groove 8 is sealed by the fixing ring 10. The elastic body section 11 and the additional mass section 12 are disposed in this sealed space in the groove 8.

The elastic body section 11 is made of, for example, rubber. The vibration generated in the wheel 2 during travelling of a vehicle is transmitted to the elastic body section 11 and the additional mass section 12 through the fixing ring 10, thereby causing the elastic body section 11 and the additional mass section 12 to vibrate. A gap is formed between the elastic body section 11 and an inner surface of the groove 8 and between the additional mass section 12 and the inner surface of the groove 8 such that the elastic body section 11 and the additional mass section 12 will not come into contact with the inner surface of the groove 8 even if they are caused to vibrate.

The elastic body section 11 and the additional mass section 12 are disposed in the groove 8 of the rim section 5, and a fixing ring 10 fixed to the rim section 5 lies at an opening side of the groove 8 with respect to the elastic body section 11 and the additional mass section 12. As a result, even if the additional mass section 12 is separated from the elastic body section 11, or the elastic body section 11 is separated from the fixing ring 10, it is not likely that those separated elastic body section 11 and additional mass section 12 fall off the soundproof wheel 1.

Due to the configuration that the fixing ring 10 which is one of the components constituting the soundproofing device 3 is fixed to the rim section 5 of the wheel 2, there will be no rubbing between the soundproofing device 3 and the rim section 5 of the wheel 2. Further, even if the elastic body section 11 deteriorates, resulting in a decline in elasticity thereof, the additional mass section 12 will not collide with any member other than the rim section 5. Therefore, the soundproof wheel 1 is highly durable.

Figure 2:
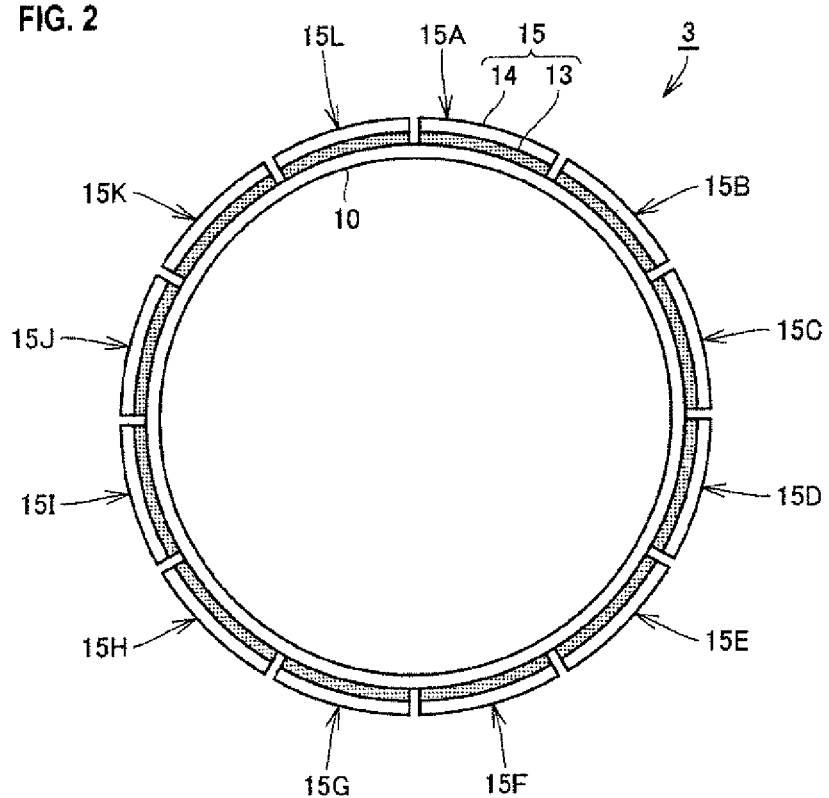
FIG. 2 is a plan view to show an example of a soundproofing device which can be used for a soundproof wheel of the present invention.

FIG. 2 is a plan view to show an example of the soundproofing device 3.

The elastic body section 11 includes a plurality of elastic body pieces 13 spaced apart from each other in a circumferential direction of the soundproofing device 3. The additional mass section 12 includes a plurality of additional mass pieces 14 spaced apart from each other in the circumferential direction of the soundproofing device 3. In the example of FIG. 2, the elastic body section 11 includes 12 elastic body pieces 13, and the additional mass section 12 includes 12 additional mass pieces 14. Each additional mass piece 14 is adhered to any of the elastic body pieces 13.

Each elastic body piece 13 and the additional mass piece 14 adhered to the elastic body piece 13 constitute a dynamic vibration absorber 15. In the example of FIG. 2, the soundproofing device 3 includes 12 dynamic vibration absorbers 15A to 15L. Regarding the circumferential direction of the soundproofing device 3, each dynamic vibration absorber 15 has a substantially flush end face.

The wheel 2 normally has multiple natural frequencies respectively corresponding to multiple natural vibration modes. At least one dynamic vibration absorber 15 of the dynamic vibration absorbers 15A to 15L has a resonance frequency different from that of another dynamic vibration absorber 15. That is, the dynamic vibration absorbers 15A to 15L have at least two resonance frequencies. Any of the resonance frequencies of the dynamic vibration absorbers 15A to 15L coincides with any of the natural frequencies of the wheel 2. As a result, it is possible to concurrently reduce noise corresponding to at least two natural frequencies, among the multiple natural frequencies of the wheel 2.

The dynamic vibration absorbers 15A to 15L preferably have at least three resonance frequencies, each of which coincides with any natural frequency of the wheel 2. This makes it possible to efficiently reduce noise of the wheel 2.

As described above, wheel rolling noise due to natural vibrations of the plate section 4 and the rim section 5 is generated from the wheel 2. Such noise includes, for example, frequency components of 2.0 kHz, 2.5 kHz, and 3.0 kHz in frequency ranges to which human auditory sense is sensitive, for example, a range of 1 kHz to 10 kHz.

In this case, for example, the dynamic vibration absorbers 15A to 15L can be divided into a first to third groups such that the dynamic vibration absorbers 15 belonging to the first group each have a resonance frequency of 2.0 kHz, the dynamic vibration absorbers 15 belonging to the second group each have a resonance frequency of 2.5 kHz, and the dynamic vibration absorbers 15 belonging to the third group each have a resonance frequency of 3.0 kHz. As a result, it is possible to significantly reduce noise in auditory sense. The first to third groups can be each made up of 4 dynamic vibration absorbers 15.

Moreover, configuring any of the dynamic vibration absorbers 15A to 15L to have a resonance frequency corresponding to a frequency of squeak noise makes it possible to reduce the squeak noise. Similarly, configuring any of the dynamic vibration absorbers 15A to 15L to have a resonance frequency corresponding to a frequency of noise attributable to wavy wear makes it possible to reduce such noise.

It is possible to obtain a desired value for each resonance frequency of the dynamic vibration absorbers 15A to 15L by setting appropriate values for the spring constant k of the elastic body piece 13 and the mass m of the additional mass piece 14 based on Formula (1).

The soundproof wheel 1 can be produced by first providing the soundproofing device 3 with a disconnected part in the circumference thereof, and after fitting the additional mass section 12, the elastic body section 11, and an outer peripheral portion of the fixing ring 10 in the groove 8 of the rim section 5, joining the disconnected section of the soundproofing device 3 by, for example, welding.

Regarding the axial direction of the soundproofing device 3, the length of the elastic body section 11 (each elastic body piece 13) is not less than 5 mm and not more than 10 mm, and the length of the additional mass section 12 (each additional mass piece 14) is not less than 5 mm and not more than 10 mm By arranging the elastic body section 11 and the additional mass section 12 to have such sizes, it becomes easy to attach them to the fixing ring 10, and to adjust their resonance frequencies.

Figure 3:
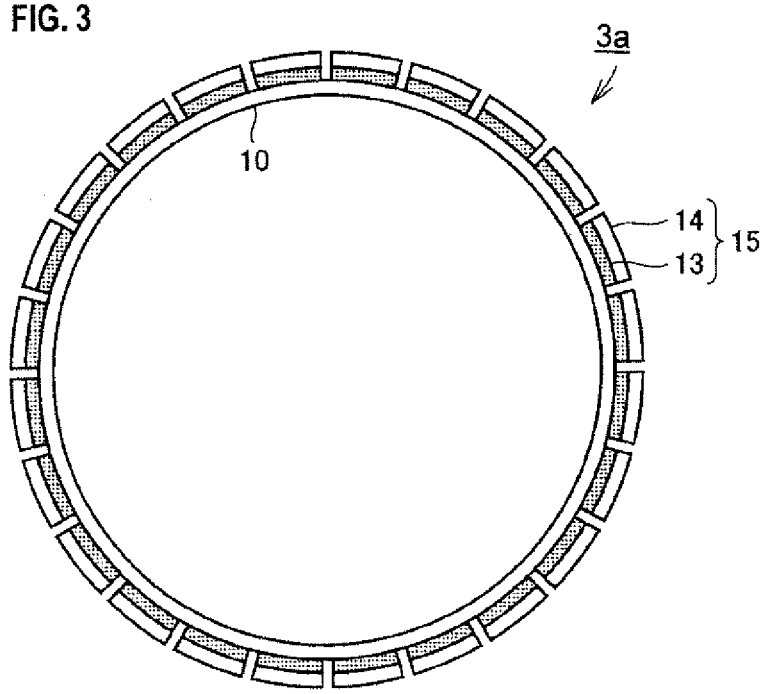
FIG. 3 is a plan view to show another example of a soundproofing device which can be used for a soundproof wheel of the present invention.

The number of the dynamic vibration absorbers 15 may be other than 12, for example, 24 as shown in FIG. 3 and the sound proof device 3a. In this case, since the number of the dynamic vibration absorbers 15 increases compared with the soundproofing device 3 of FIG. 2, it is possible to increase the number of corresponding resonance frequencies of the wheel 2. Moreover, since even when the elastic body piece 13 of some of the dynamic vibration absorbers 15 deteriorates, resulting in deterioration of the performance as the dynamic vibration absorber 15, vibration can be reduced by other dynamic vibration absorbers 15, it is possible to suppress deterioration of the vibration control (rolling noise reduction) performance of the wheel 2. It becomes easier to obtain such effect as the number of the dynamic vibration absorbers 15 increases.

On the other hand, since increase in the number of the dynamic vibration absorbers 15 results in decrease in the lengths of the additional mass pieces 14 and the elastic body pieces 13 in the circumferential direction of the wheel 2, it may become more likely that the additional mass piece 14 is separated from the fixing ring 10 due to deterioration of the elastic body piece 13. By decreasing the number of the dynamic vibration absorbers 15, and increasing the lengths of the additional mass pieces 14 and the elastic body pieces 13 in the circumferential direction of the wheel 2, it is possible to make such separation less likely to occur. However, since the additional mass piece 14 will remain in the groove 8 sealed by the fixing ring 10 even if it is separated from the fixing ring 10, the possibility that it falls off will be very low.

Figure 4A:
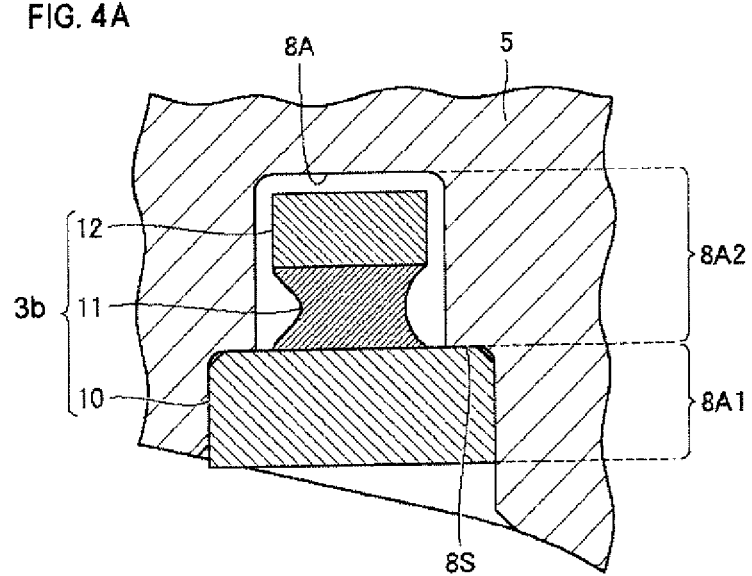
FIG. 4A is a sectional view of a soundproof wheel according to a first variation of the embodiment shown in FIG. 1A to FIG. 3.

FIG. 4A is a sectional view of a soundproof wheel with a soundproof device 3b according to a first variation of the embodiment shown in FIG. 1A to FIG. 3, showing a section including the central axis of the wheel. In FIG. 4A, components 10, 11, and 12 corresponding to those shown in FIG. 1B are given the same reference symbols as those of FIG. 1B, thus omitting description thereof.

In this soundproof wheel, a groove 8A which is opened toward the central axis of the wheel is formed in a rim section 5 of the wheel. A fixing ring 10 included in the soundproofing device 3b is fitted in the groove 8A. As a result, a sealed space is formed in the groove 8A, and the elastic body section 11 and the additional mass section 12 are disposed in the sealed space in the groove 8A.

The fixing ring 10 has a substantially constant width. The groove 8A includes a first portion 8A1, and a second portion 8A2 which is formed nearer the bottom of the groove 8A with respect to the first portion 8A1. The first portion 8A1 has a width substantially equal to the width of the fixing ring 10 (minimum width). The second portion 8A2 has a width smaller than the width of the fixing ring 10. In this embodiment, both of the widths of the first and second portions 8A1 and 8A2 are substantially constant, and a step 8S is formed in an inner wall of the groove 8A between the first portion 8A1 and the second portion 8A2.

The fixing ring 10 is fixed to the rim section 5 in a state of being in contact with the step 8S. As a result of the second portion 8A2 having a width smaller than the width of the fixing ring 10, the fixing ring 10 cannot move closer to a bottom face of the groove 8A from a state of being in contact with the step 8S. Therefore, in this state, the interval between the fixing ring 10 and the bottom face of the groove 8A is kept constant. This interval is set such that the additional mass section 12 and the bottom face of the groove 8A are spaced apart by not less than a constant distance (for example, 1 mm, and preferably 2 mm) even when the additional mass section 12 moves closer to the bottom face of the groove 8A by vibration. As a result, it is possible to avoid a situation in which the additional mass section 12 and the bottom face of the groove 8A come into contact with each other, disabling the elastic body section 11 and the additional mass section 12 to function as the dynamic vibration absorber.

Figure 4B:
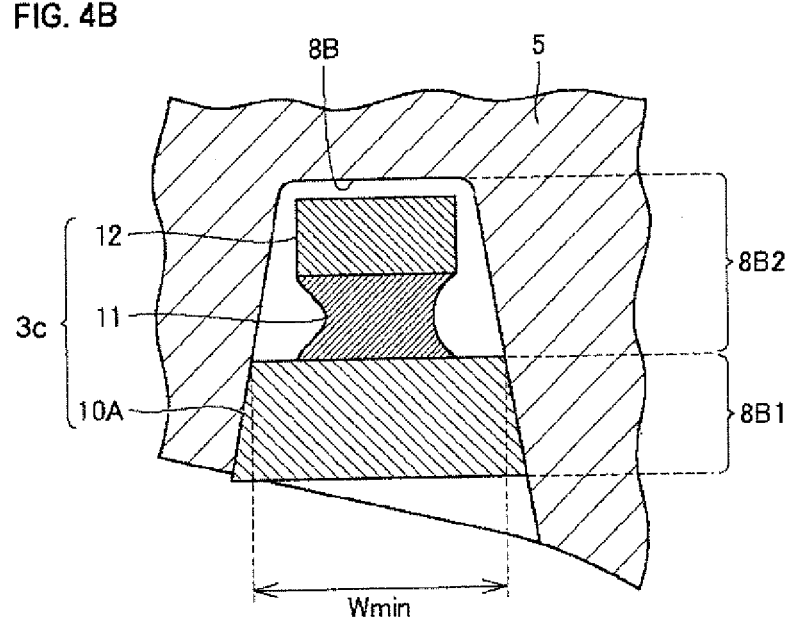
FIG. 4B is a sectional view of a soundproof wheel according to a second variation of the embodiment shown in FIG. 1A to FIG. 3.

FIG. 4B is a sectional view of a soundproof wheel with soundproof device 3c according to a second variation of the embodiment shown in FIG. 1A to FIG. 3, showing a section including the central axis of the wheel. In FIG. 4B, components 11 and 12 corresponding to those shown in FIG. 1B are given the same reference symbols as those of FIG. 1B, thus omitting description thereof.

In this soundproof wheel, a groove 8B which is opened toward the central axis of the wheel is formed in a rim section 5 of the wheel. A fixing ring 10A included in a soundproofing device 3c is fitted in the groove 8B. As a result, a sealed space is formed in the groove 8B, and an elastic body section 11 and an additional mass section 12 are disposed in the sealed space in the groove 8B.

The groove 8B has a trapezoidal shape in this section, and its width becomes smaller as moving closer to the bottom of the groove 8B. The fixing ring 10A has a trapezoidal shape in this section, and the length of the upper base is the minimum width Wmin. The groove 8B includes a first portion 8B1, and a second portion 8B2 which is formed nearer the bottom of the groove 8B with respect to the first portion 8B1. The first portion 8B1 has a width equal to the minimum width Wmin of the fixing ring 10, or a width larger than the minimum width Wmin. The second portion 8B2 has a width smaller than the minimum width Wmin of the fixing ring 10.

The angle foamed by a pair of inner walls of the groove 8B is substantially equal to the angle formed by a pair of side faces of the fixing ring 10A. The fixing ring 10A is fitted in the groove 8B with its face having a minimum width being oriented toward the bottom face of the groove 8B. The side face of the fixing ring 10A is in contact with the inner wall of the groove 8B over substantially the entire surface.

As a result of that the second portion 8B2 has a width smaller than the minimum width Wmin of the fixing ring 10A, the fixing ring 10A cannot move closer to the bottom face of the groove 8B from a state in which its side faces are in contact with the inner walls of the groove 8B. Therefore, in this state, the interval between the fixing ring 10A and the bottom face of the groove 8B is kept constant. Therefore, appropriately setting this interval will make it possible, as in the first variation, to avoid a situation in which the additional mass section 12 and the bottom face of the groove 8B come into contact with each other, disabling the elastic body section 11 and the additional mass section 12 to function as the dynamic vibration absorber.

Figure 5A:
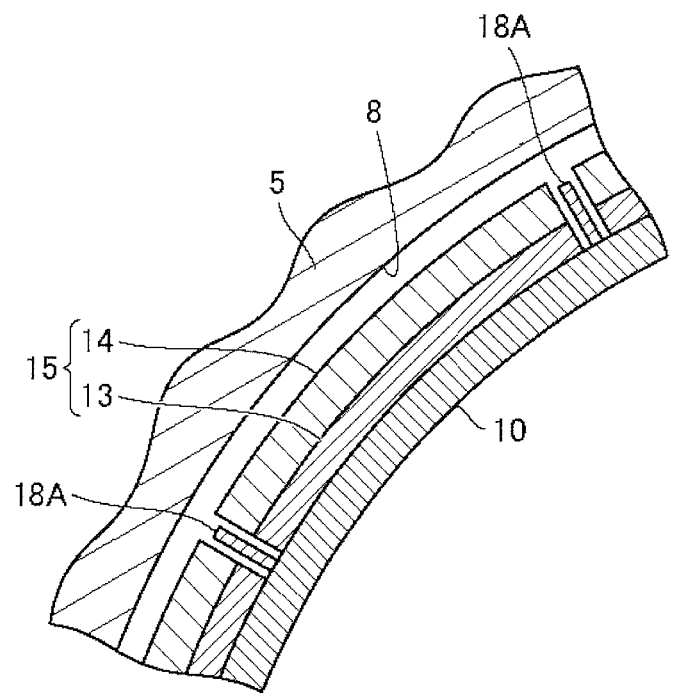
FIG. 5A is a sectional view of a soundproof wheel according to a third variation of the embodiment shown in FIG. 1A to FIG. 3.

FIG. 5A is a sectional view of a soundproof wheel according to a third variation of the embodiment shown in FIG. 1A to FIG. 3, showing a section perpendicular to the central axis of the wheel. In FIG. 5A, components corresponding to those shown in FIG. 2 are given the same reference symbols as those of FIG. 2, thus omitting description thereof.

A protrusion 18A protruding from the outer peripheral surface of the fixing ring 10 is provided between the dynamic vibration absorbers 15 adjacent to each other in the circumferential direction. The protrusion 18A is fixed to the fixing ring 10, and extends to between the additional mass pieces 14 adjacent to each other in the circumferential direction. This embodiment is configured such that the height of the protrusion 18A from the outer peripheral surface of the fixing ring 10 is slightly smaller than the height of the dynamic vibration absorber 15 from the outer peripheral surface of the fixing ring 10.

The dynamic vibration absorber 15 and the protrusion 18A are sufficiently spaced apart such that the dynamic vibration absorber 15 will not come into contact with the protrusion 18A even if the dynamic vibration absorber 15 vibrates. Therefore, there will be no case that the dynamic vibration absorber 15 and the protrusion 18A come into contact with each other, impairing the function of the dynamic vibration absorber 15.

When the protrusion 18A is not provided, if the elastic body piece 13 breaks off, problems arise in that as a result of the additional mass piece 14 moves in the groove 8, abnormal noise occurs, and dynamic balance during rotation of the wheel is disturbed. Such problems can be made less likely to occur in the embodiment of FIG. 5A, since the additional mass pieces 14 are restricted from moving in the circumferential direction of the wheel as a result of provision of the protrusion 18A.

The protrusion 18A may be integral with the fixing ring 10, or a separate body. When the protrusion 18A is a separate body from the fixing ring 10, the protrusion 18A may be made of, for example, the same material as that of the elastic body piece 13. In this case, the elastic body piece 13 and the protrusion 18A can be formed collectively. Specifically, it is possible to form an elastic body piece 13 and a protrusion 18A collectively by disposing a mold formed with concave parts corresponding to the elastic body piece 13 and the protrusion 18A over the entire circumference on the outer peripheral surface of the fixing ring 10, poring liquid precursor, which provides raw material for the elastic body piece 13 and the protrusion 18A, into the concave part, and thereafter causing the precursor to be hardened.

In this production method, the liquid precursor may intrude into between the outer peripheral surface of the fixing ring 10 and the mold, thereafter being hardened as-is. In this case, the elastic body piece 13 and the protrusion 18A will not be separated completely, and is formed to be connected with a thin film of elastic body. However, even in this case, each dynamic vibration absorber 15 has a resonance frequency as designed and vibrates in a mutually independent manner. That is, the plurality of elastic body pieces 13 exhibit substantially same behavior as in the case in which they are spaced apart from each other in the circumferential direction of the fixing ring 10. Therefore, each dynamic vibration absorber can absorb vibration of a predetermined frequency.

Figure 5B:
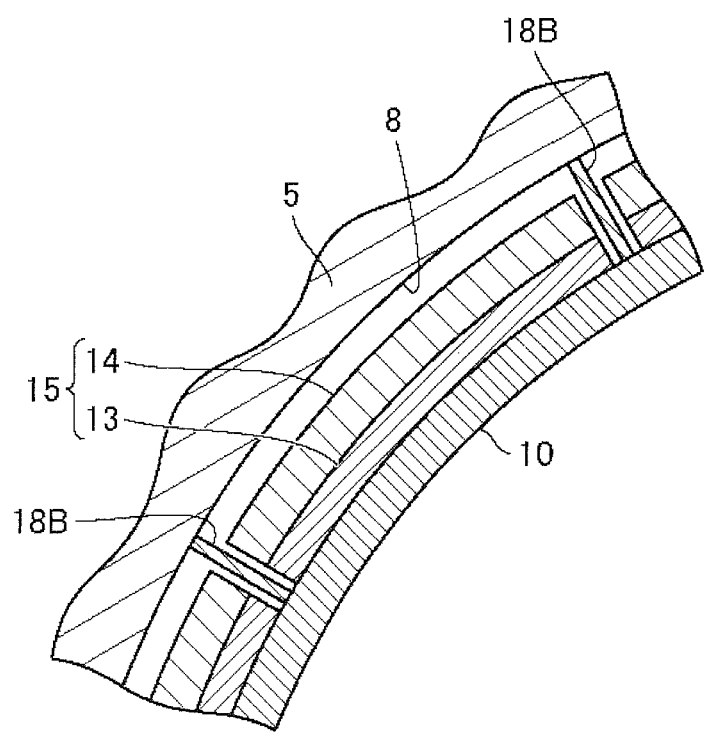
FIG. 5B is a sectional view of a soundproof wheel according to a fourth variation of the embodiment shown in FIG. 1A to FIG. 3.

FIG. 5B is a sectional view of a soundproof wheel according to a fourth variation of the embodiment shown in FIG. 1A to FIG. 3, showing a section perpendicular to the central axis of the wheel. In FIG. 5B, components corresponding to those shown in FIG. 2 are given the same reference symbols as those of FIG. 2, thus omitting description thereof.

A protrusion 18B protruding from the outer peripheral surface of the fixing ring 10 is provided between the dynamic vibration absorbers 15 adjacent to each other in the circumferential direction. The protrusion 18B is fixed to the fixing ring 10, and extends through between the additional mass pieces 14 adjacent to each other in the circumferential direction. The distal end (the furthest portion from the outer peripheral surface of the fixing ring 10) of the protrusion 18B is in contact with the bottom face of the groove 8. As a result of the protrusion 18B being provided, it becomes possible, as in the embodiment shown in FIG. 5A, to restrict the additional mass piece 14 from moving in the circumference direction of the wheel when the elastic body piece 13 breaks off, thereby suppressing occurrence of abnormal noise, as well as making it easier to keep dynamic balance during rotation of the wheel.

Although the protrusion 18B may be integral with the fixing ring 10, or a separate body, it is made of a high rigidity material, in either case. As a result, the interval between the fixing ring 10 and the bottom face of the groove 8 is kept constant. This interval is set such that even if the additional mass piece 14 is moved close to the bottom face of the groove 8 by vibration, the additional mass piece 14 and the bottom face of the groove 8 are spaced apart by not less than a constant distance (for example, 1 mm, and preferably 2 mm) As a result, it is possible to avoid a situation in which the additional mass piece 14 and the bottom face of the groove 8 come into contact with each other, disabling the function of the dynamic vibration absorber 15. In this point, the embodiment of FIG. 5B can achieve same effects as those of the embodiment shown in FIGS. 4A and 4B.

TABLE 1

| Type of soundproofing device | Resonance frequency (kHz) |
|---|---|
| TYPE-i | 2.0 |
| TYPE-ii | 2.5 |
| TYPE-iii | 3.0 |

TABLE 2

| | Soundproofing device | | | | | | |
|---|---|---|---|---|---|---|---|
| | 15A | 15B | 15C | 15D | 15E | 15F | 15G |
| Example 1 | TYPE-ii | TYPE-i | TYPE-iii | TYPE-ii | TYPE-i | TYPE-iii | TYPE-ii |
| Example 2 | TYPE-i | TYPE-i | TYPE-iii | TYPE-iii | TYPE-ii | TYPE-ii | TYPE-i |
| Example 3 | TYPE-ii | TYPE-i | TYPE-iii | TYPE-iii | TYPE-i | TYPE-ii | TYPE-ii |
| Example 4 | TYPE-i | TYPE-i | TYPE-iii | TYPE-iii | TYPE-i | TYPE-i | TYPE-ii |
| Comparative Example 1 | — | — | — | — | — | — | — |
| Comparative Example 2 | TYPE-i | TYPE-i | TYPE-i | TYPE-i | TYPE-i | TYPE-i | TYPE-i |
| Comparative Example 3 | TYPE-ii | TYPE-ii | TYPE-ii | TYPE-ii | TYPE-ii | TYPE-ii | TYPE-ii |
| Comparative Example 4 | TYPE-iii | TYPE-iii | TYPE-iii | TYPE-iii | TYPE-iii | TYPE-iii | TYPE-iii |
| Comparative Example 5 | — | — | — | — | — | — | — |

| | Soundproofing device | | | | | |
|---|---|---|---|---|---|---|
| | 15H | 15I | 15J | 15K | 15L | Remarks |
| Example 1 | TYPE-i | TYPE-iii | TYPE-ii | TYPE-i | TYPE-iii | Examples of the present invention |
| Example 2 | TYPE-i | TYPE-iii | TYPE-iii | TYPE-ii | TYPE-ii | |
| Example 3 | TYPE-i | TYPE-iii | TYPE-iii | TYPE-i | TYPE-ii | |
| Example 4 | TYPE-ii | TYPE-iii | TYPE-iii | TYPE-ii | TYPE-ii | |
| Comparative Example 1 | — | — | — | — | — | Without soundproofing device |
| Comparative Example 2 | TYPE-i | TYPE-i | TYPE-i | TYPE-i | TYPE-i | With only one kind of soundproofing device |
| Comparative Example 3 | TYPE-ii | TYPE-ii | TYPE-ii | TYPE-ii | TYPE-ii | |
| Comparative Example 4 | TYPE-iii | TYPE-iii | TYPE-iii | TYPE-iii | TYPE-iii | |
| Comparative Example 5 | — | — | — | — | — | Wheel according to Patent Literature 2 |

EXAMPLES

A test using a wheel rolling noise tester was conducted on soundproof wheels which were examples of the present invention, and wheels which were comparative examples not satisfying part of the requirements of the present invention, to investigate noise to be generated.

As Examples 1 to 4, soundproof wheels 1 which each includes a soundproofing device 3 having the structure shown in FIG. 2, and in which each dynamic vibration absorber 15A to 15L was any of three types (TYPE-i to TYPE-iii) having different resonance frequencies were fabricated. The natural frequencies of the soundproof wheel 1 corresponding to major natural vibration modes of the wheel 2 were 2.0 kHz, 2.5 kHz, and 3.0 kHz.

Table 1 shows resonance frequencies of the dynamic vibration absorbers 15 of each type. Table 2 shows contents of the dynamic vibration absorbers of the soundproof wheels of Examples, and the wheels of Comparative Examples.

While 4 dynamic vibration absorbers 15 of TYPE-i, 4 dynamic vibration absorbers 15 of TYPE-ii, and 4 dynamic vibration absorbers 15 of TYPE-iii were used in any of Examples, positional relationships for the 3 types of the dynamic vibration absorbers 15 were varied from each other among Examples 1 to 4.

As Comparative Examples, an ordinary wheel (Comparative Example 1) having no soundproofing device, a wheel (Comparative Example 2) in which all of the dynamic vibration absorbers 15A to 15L were of TYPE-i, a wheel (Comparative Example 3) in which all of the dynamic vibration absorbers 15A to 15L were of TYPE-ii, a wheel (Comparative Example 4) in which all of the dynamic vibration absorbers 15A to 15L were of TYPE-iii, and a wheel (Comparative Example 5) in which in place of the soundproofing device 3, a soundproof ring adopted in Patent Literature 2 was mounted to the wheel 2 were prepared.

Figure 6:
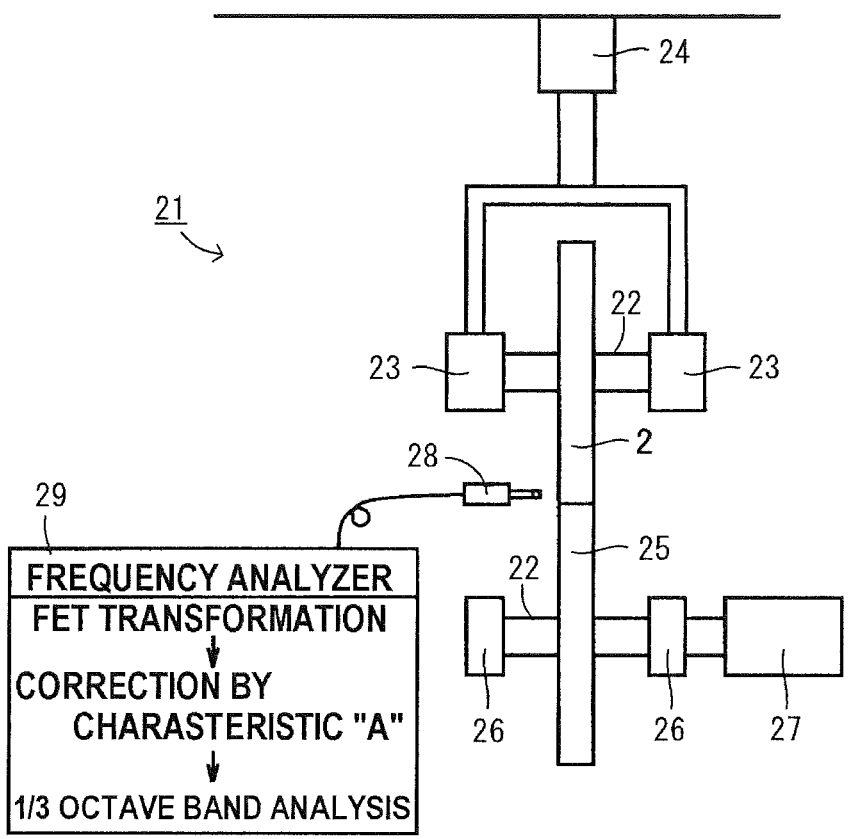
FIG. 6 is a schematic diagram to show a configuration of a wheel rolling noise tester.

FIG. 6 is a schematic diagram to show a configuration of a wheel rolling noise tester used in the test.

The wheel rolling noise tester 21 includes: a bearing 23 for rotatably supporting an axle 22 attached to a wheel 2 (soundproof wheel 1) to be tested; a hydraulic jack 24 attached to the bearing 23 and for pressing the bearing 23 downward; a rail wheel 25 configured to abut against an outer peripheral portion of the wheel 2 supported by the bearing 23 through the axle 22, and to rotate the wheel 2; a bearing 26 for supporting the axle 22 attached to the rail wheel 25; a motor 27 for rotatively driving the axle 22 supported by the bearing 26; a precision noise meter 28 for measuring noise generated from the wheel 2 and generating an electric signal corresponding to the noise; and a frequency analyzer 29 for receiving input of the electric signal from the precision noise meter 28, and performing frequency analysis of the electric signal.

When performing test, the axle 22 attached to the wheel 2 and the axle 22 attached to the rail wheel 25 were arranged in parallel with each other; the outer peripheral surface of the wheel 2 supported by the bearing 23 through the axle 22 was pressed against the outer peripheral surface of the rail wheel 25 supported by the bearing 26 through the axle 22 by being driven by the hydraulic jack 24; and the rail wheel 25 was rotated by the motor 27 in this state. As the result, the wheel 2 was rotated.

The precision noise meter 28 was disposed at a position 300 mm away from the wheel 2, and generated noise was measured by the precision noise meter 28 by rotating the soundproof wheels 1 of Examples and wheels of Comparative Examples by the wheel rolling noise tester 21. The circumferential speed of the rail wheel 25 during noise measurement was supposed to be the rotational speed of the wheel 2 at that time. The circumferential speed of the rail wheel 25 was determined from the number of revolution of the motor 27 and the diameter of the rail wheel 25 (910 mm in the wheel rolling noise tester 21). For example, when the number of revolution of the motor 27 was 1750 rpm, the circumferential speed of the rail wheel 25 was 300 km/h.

Noise measurement was performed by setting the precision noise meter 28 at FLAT characteristics (without auditory correction) and FAST dynamic characteristics. After the measurement by the precision noise meter 28, frequency analysis of noise was performed by the frequency analyzer 29 based on the inputted signal.

Figure 7:
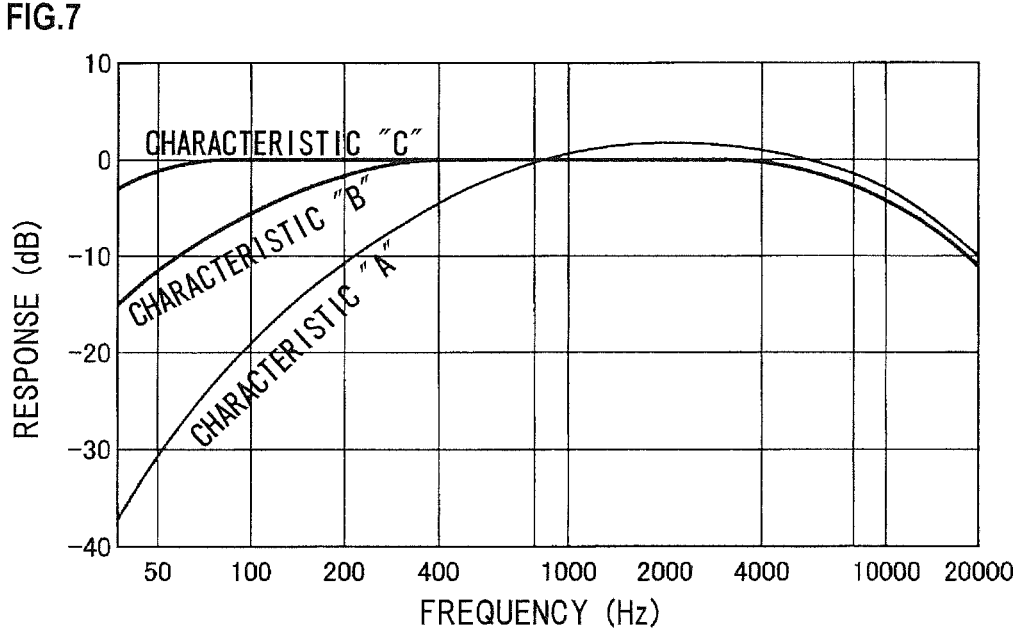
FIG. 7 is a diagram to show noise correction levels to be used when performing noise analysis.

FIG. 7 is a diagram to show noise correction levels to be used when analyzing noise. After applying correction by the characteristic "A" of FIG. 7 on the measured noise, ⅓ octave band processing was performed to determine frequency characteristics and Overall values. The results are shown in FIGS. 8 to 11.

Figure 8:
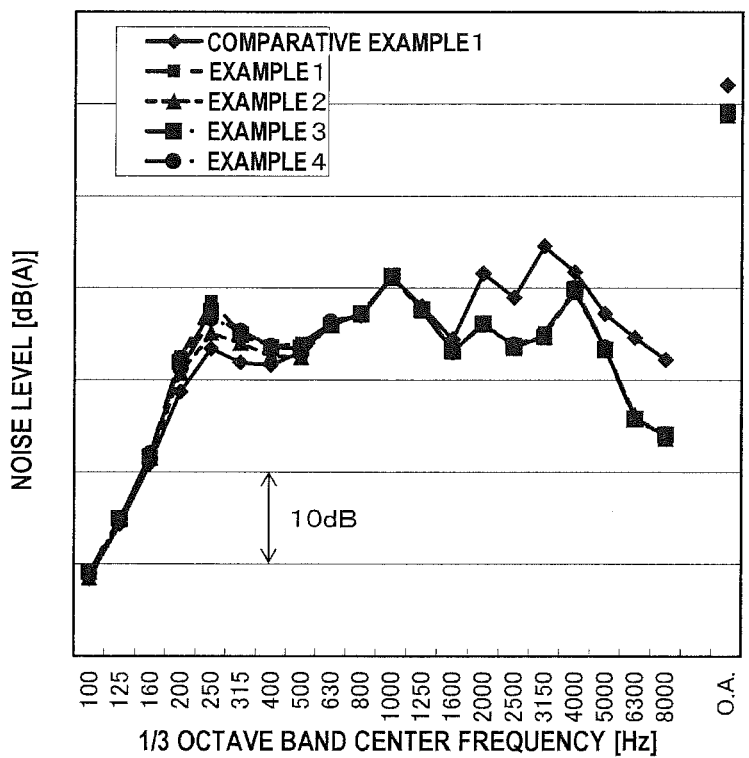
FIG. 8 is a diagram showing a relationship between a ⅓ octave band center frequency and a noise level for Examples 1 to 4 and Comparative Example 1.
Figure 9:
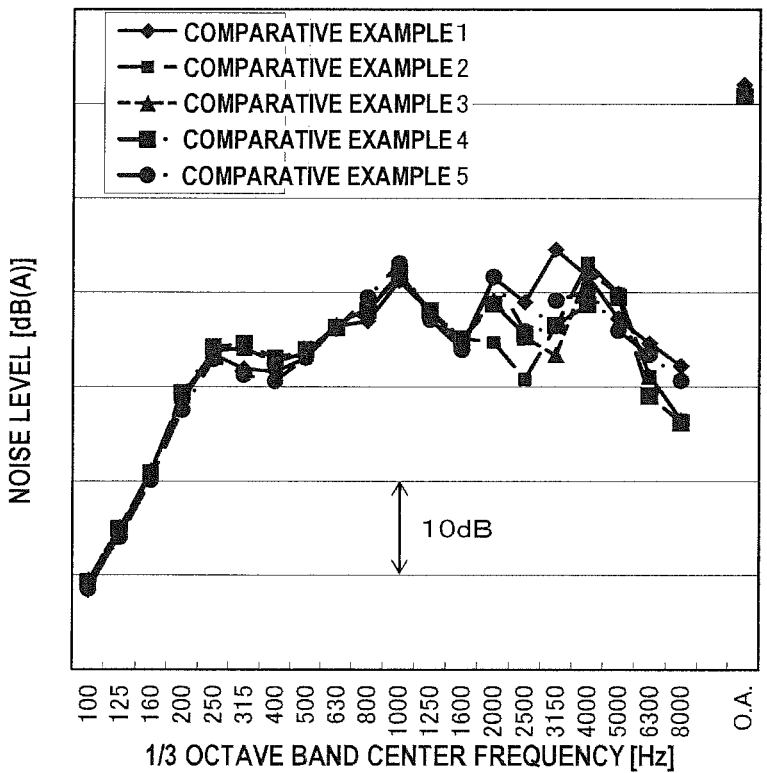
FIG. 9 is a diagram showing a relationship between a ⅓ octave band center frequency and a noise level for Comparative Examples 1 to 5.

FIG. 8 is a diagram showing the relationship between the ⅓ octave band center frequency and the noise level for Examples 1 to 4 and Comparative Example 1. FIG. 9 is a diagram showing the relationship between the ⅓ octave band center frequency and the noise level for Comparative Examples 1 to 5. The results shown in FIGS. 8 and 9 are those obtained when the rotational speed of the wheel 2 (circumferential speed of the rail wheel 25) was 200 km/h. Overall values (O.A.) are shown at near the right end of FIGS. 8 and 9.

From FIG. 8, it is seen that all of the soundproof wheels 1 of Examples 1 to 4 were able to significantly reduce noise around 2.0 kHz, 2.5 kHz, and 3.0 kHz compared with Comparative Examples 1, that is, the case without any soundproofing device. There was no significant difference observed among Examples 1 to 4. That is, there was substantially no difference in noise reduction effect due to the disposition of the dynamic vibration absorbers 15 of TYPE-i to TYPE-iii adopted in Examples 1 to 4.

In contrast to this, as obvious from FIG. 9, the wheels of Comparative Examples 2 to 4 were only able to reduce noise around a frequency of one level of the resonance frequencies of the dynamic vibration absorbers 15, and were not able to reduce noise at other frequencies. The wheel of Comparative Example 5 showed less noise reduction effect compared with the soundproof wheels 1 of Examples 1 to 4 at least in the overall value.

Figure 10:
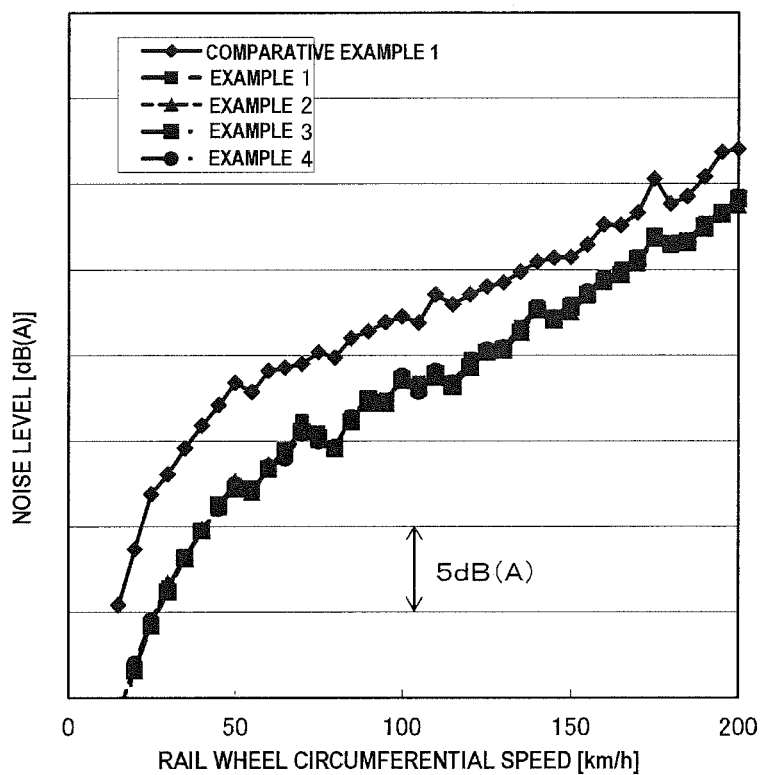
FIG. 10 is a diagram showing a relationship between a circumferential speed of the rail wheel and a noise level for Examples 1 to 4, and Comparative Example 1.
Figure 11:
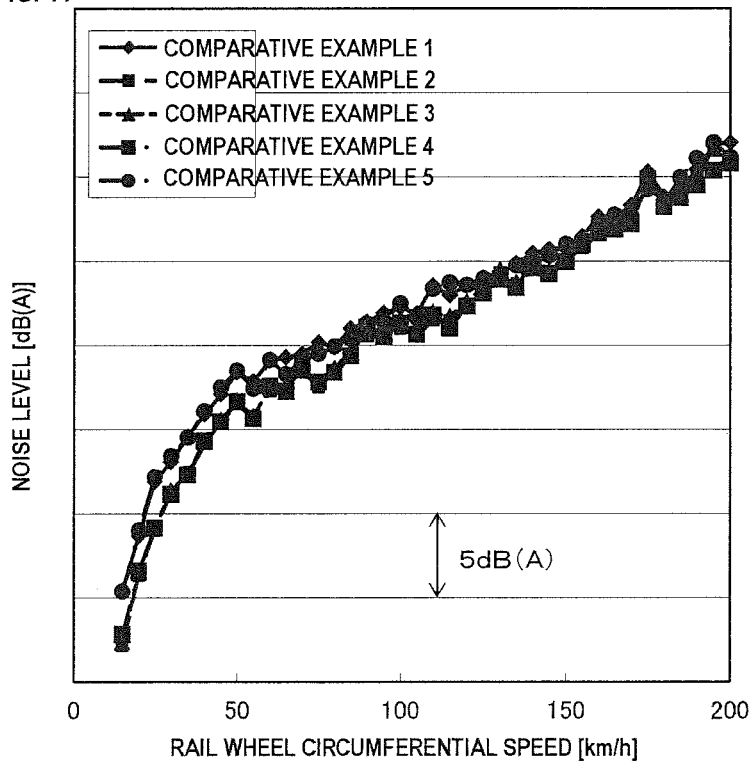
FIG. 11 is a diagram showing a relationship between a circumferential speed of rail wheel and a noise level for Comparative Examples 1 to 5.

FIG. 10 is a diagram showing the relationship between the circumferential speed of the rail wheel 25 and the noise level for Examples 1 to 4, and Comparative. Example 1. FIG. 11 is a diagram showing the relationship between the circumferential speed of the rail wheel 25 and the noise level for Comparative Examples 1 to 5. In FIGS. 10 and 11, the noise levels are shown by overall values.

As shown in FIG. 10, compared with the wheel of Comparative Example 1, that is, a case without any soundproofing device, the soundproof wheels 1 of Examples 1 to 4 achieved noise level reduction of not less than 5 dB(A) in a low speed range in which the circumferential speed of the rail wheel 25 was not more than 130 km/h, and also achieved noise level reduction of not less than 3 dB(A) in a high speed range of not less than 140 km/h as well.

On the other hand, as shown in FIG. 11, there was substantially no noise reduction effect observed in the wheels of Comparative Examples 2 to 5 compared with the wheel of Comparative Example 1.

REFERENCE SIGNS LIST

1 Soundproof wheel
2 Wheel
3, 3a, 3b, 3c Soundproofing device
5 Rim section
6 Inner peripheral surface
8, 8A, 8B Groove
8A1, 8B1 First portion of groove
8A2, 8B2 Second portion of groove
10, 10A Fixing ring
10a Outer peripheral surface
11 Elastic body section
12 Additional mass section
13 Elastic body piece
14 Additional mass piece
15, 15A to 15L Dynamic vibration absorber
18A, 18B Protrusion

The invention claimed is:
1. A soundproof wheel for a railway vehicle, comprising a soundproofing device mounted onto an inner peripheral surface of a rim section of the wheel, the soundproofing device including:
a fixing ring, at least an outer peripheral portion of the fixing ring being fitted in a groove, the groove being formed in the inner peripheral surface of the rim section and opened toward a central axis of the wheel, the fixing ring being fixed to the rim section;
an elastic body section which is adhered to an outer peripheral surface of the fixing ring along a circumferential direction of the fixing ring, and is disposed in the groove; and
an additional mass section which is adhered to an opposite side of the elastic body section with respect to the fixing ring, and is disposed in the groove, wherein
the elastic body section includes a plurality of elastic body pieces disposed along the circumferential direction of the fixing ring,
the additional mass section includes a plurality of additional mass pieces which are spaced apart from each other in the circumferential direction of the fixing ring, each additional mass piece being adhered to any one of the plurality of elastic body pieces, the wheel has multiple natural frequencies corresponding to multiple natural vibration modes, the soundproofing device includes a plurality of dynamic vibration absorbers, each dynamic vibration absorber having the elastic body piece, and the additional mass piece adhered to the elastic body piece, and at least one dynamic vibration absorber of the plurality of dynamic vibration absorbers has a resonance frequency different from the resonance frequencies of the other dynamic vibration absorbers, and any of the resonance frequencies of the plurality of dynamic vibration absorbers corresponds to any of the multiple natural frequencies.

2. The soundproof wheel according to claim 1, wherein a width of the elastic body section in an axial direction of the soundproofing device is not less than 5 mm and not more than 10 mm, and a width of the additional mass section in the axial direction of the soundproofing device is not less than 5 mm and not more than 10 mm.

3. The soundproof wheel according to claim 1, wherein in a cross section containing the axis of the soundproof wheel, the groove includes:

a first portion having a width equal to a minimum width of the fixing ring, or larger than the minimum width, and a second portion formed nearer a bottom of the groove with respect to the first portion, and having a width smaller than the minimum width of the fixing ring.

4. The soundproof wheel according to claim 1, further comprising:

a protrusion interposed between the dynamic vibration absorbers adjacent to each other in the circumferential direction, and protruding from the outer peripheral surface of the fixing ring.

5. The soundproof wheel according to claim 4, wherein a distal end of the protrusion is in contact with a bottom of the groove.

6. The soundproof wheel according to claim 2, further comprising:

a protrusion interposed between the dynamic vibration absorbers adjacent to each other in the circumferential direction, and protruding from the outer peripheral surface of the fixing ring.

7. The soundproof wheel according to claim 6, wherein a distal end of the protrusion is in contact with a bottom of the groove.

8. The soundproof wheel according to claim 3, further comprising:

a protrusion interposed between the dynamic vibration absorbers adjacent to each other in the circumferential direction, and protruding from the outer peripheral surface of the fixing ring.

9. The soundproof wheel according to claim 8, wherein a distal end of the protrusion is in contact with a bottom of the groove.

* * * * *